United States Patent [19]

Jarzebowicz et al.

[11] Patent Number: 5,218,854
[45] Date of Patent: Jun. 15, 1993

[54] SYSTEM FOR COLD EXPANDING HOLES IN RAIL SECTIONS

[75] Inventors: Richard Z. Jarzebowicz, Kirkland; Joy S. Ransom, Seattle; Eric T. Easterbrook; Charles M. Copple, both of Kent; Leonard F. Reid, Bellevue, all of Wash.

[73] Assignee: Fatigue Technology, Inc., Seattle, Wash.

[21] Appl. No.: 880,701

[22] Filed: May 8, 1992

[51] Int. Cl.⁵ .............................................. B21D 39/08
[52] U.S. Cl. .................................. 72/370; 72/391.2; 403/381
[58] Field of Search ................... 72/370, 391.2, 391.4; 29/243.521; 403/360, 381

[56] References Cited

U.S. PATENT DOCUMENTS

| | | | |
|---|---|---|---|
| 2,344,127 | 3/1944 | Cherry | 29/243.521 |
| 3,566,662 | 3/1971 | Champoux | 72/370 |
| 3,851,987 | 12/1974 | Jones | 403/381 |
| 4,187,708 | 2/1980 | Champoux | 72/30 |

Primary Examiner—Lowell A. Larson
Attorney, Agent, or Firm—Joan H. Pauly

[57] ABSTRACT

A split sleeve (96) is seated in a fastener hole (10) in the web (8) of a rail section (2). The tapered portion (26) of a mandrel (20) is firmly seated in the hole (10) inside the sleeve (96). A puller mechanism jaw (40) and a nosecap (78) are moved downwardly over the projecting rear end portion of the mandrel (20) to position the rear end portion in aligned U-shaped slots (50, 84) in the jaw (40) and nosecap (78). During the downward movement, guide surfaces (72) carried by the jaw (40) guide a chamfer (32) on the mandrel (20) into seating engagement with a tapered surface (56) on the jaw (40). The guide surfaces (72) may be formed by cylindrical pins (70) received into angled openings (58) in the jaw body. The front surface (88) of the nosecap (78) securely abuts the Web (8). With the mandrel (20) seated and the nosecap (78) abutting, the jaw (40) is moved rearwardly to pull the mandrel (20) through the hole (10) and cold expand the hole (10).

18 Claims, 3 Drawing Sheets

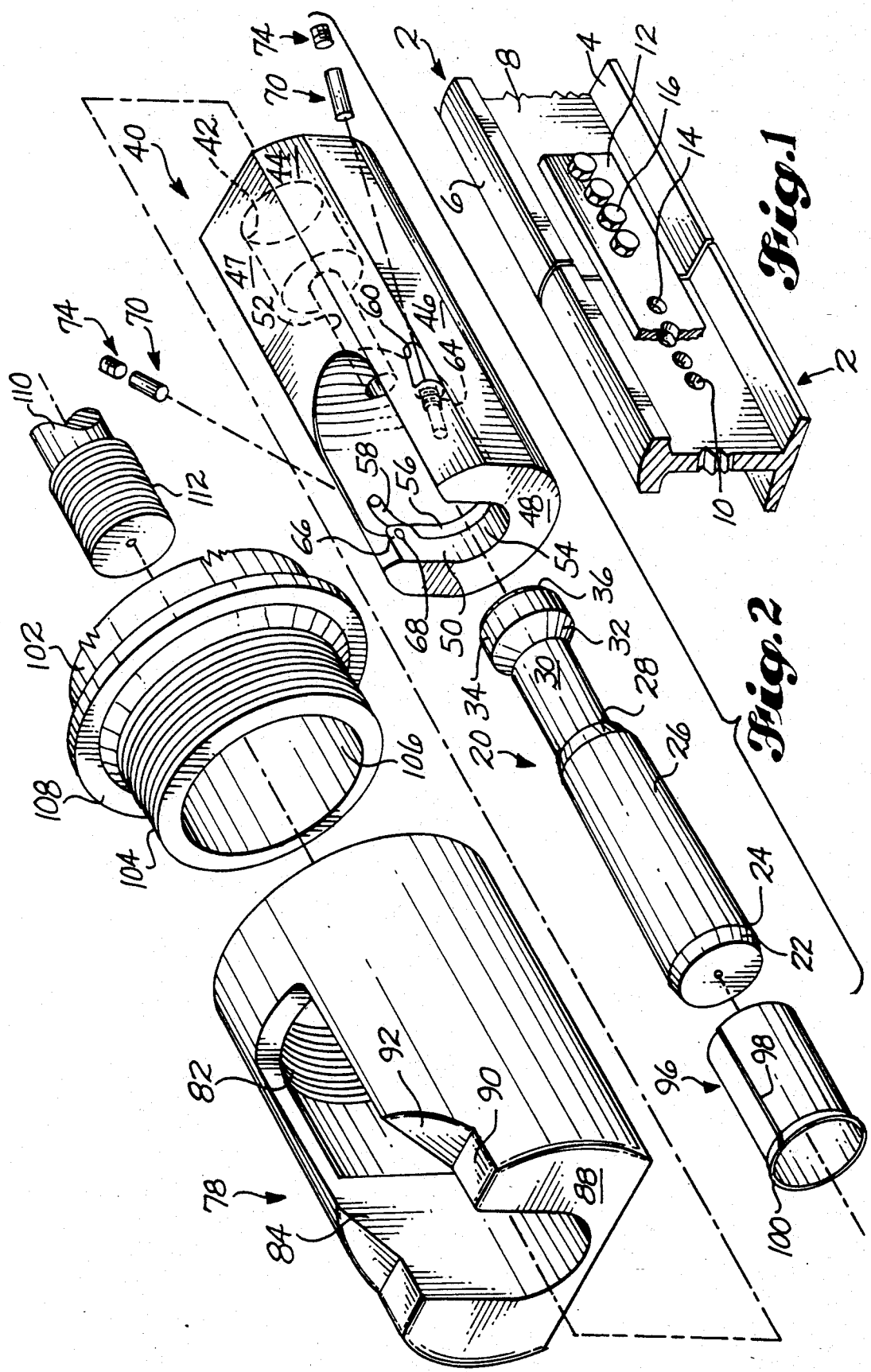

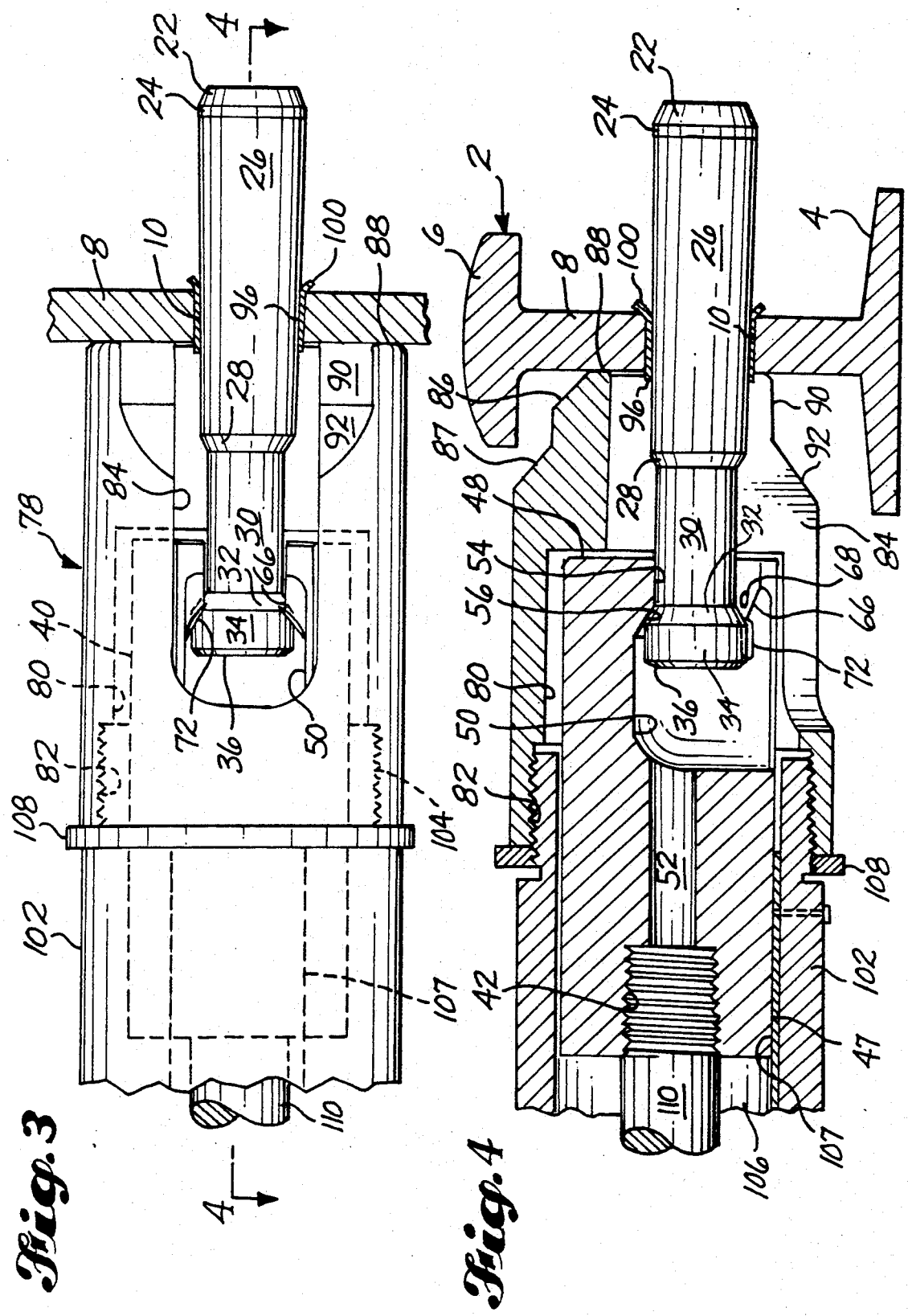

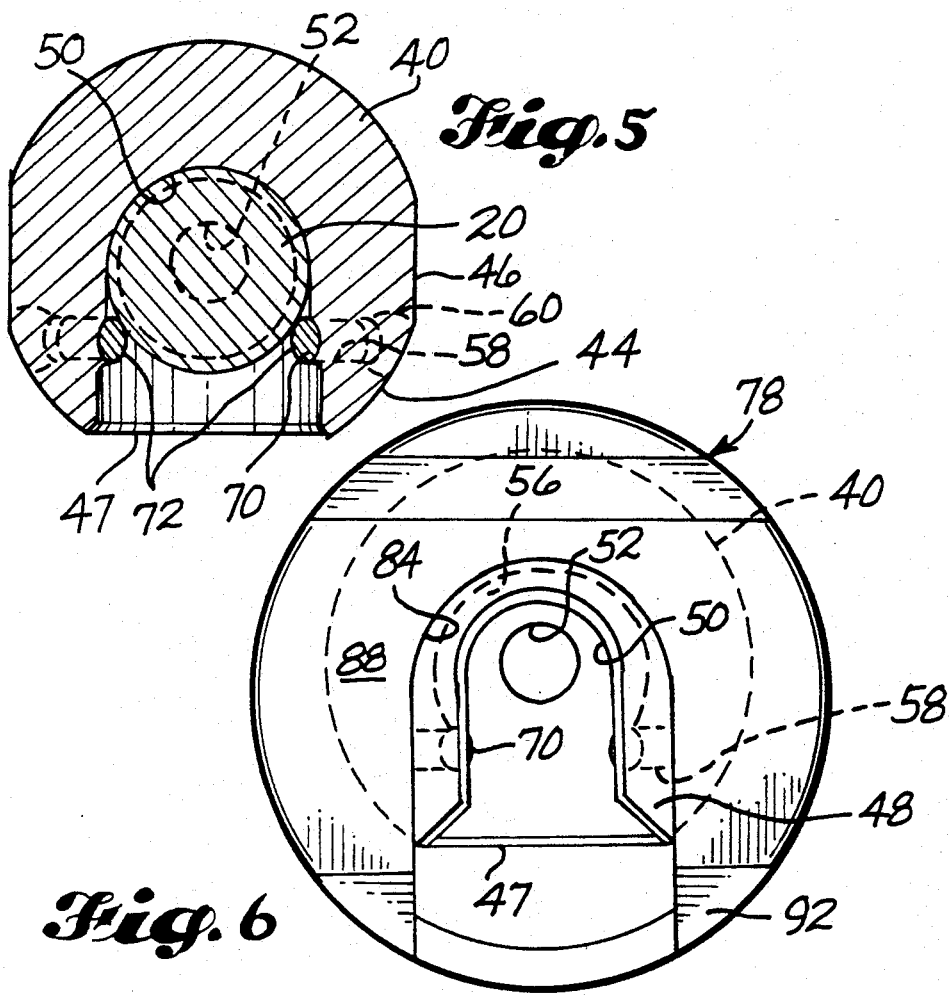
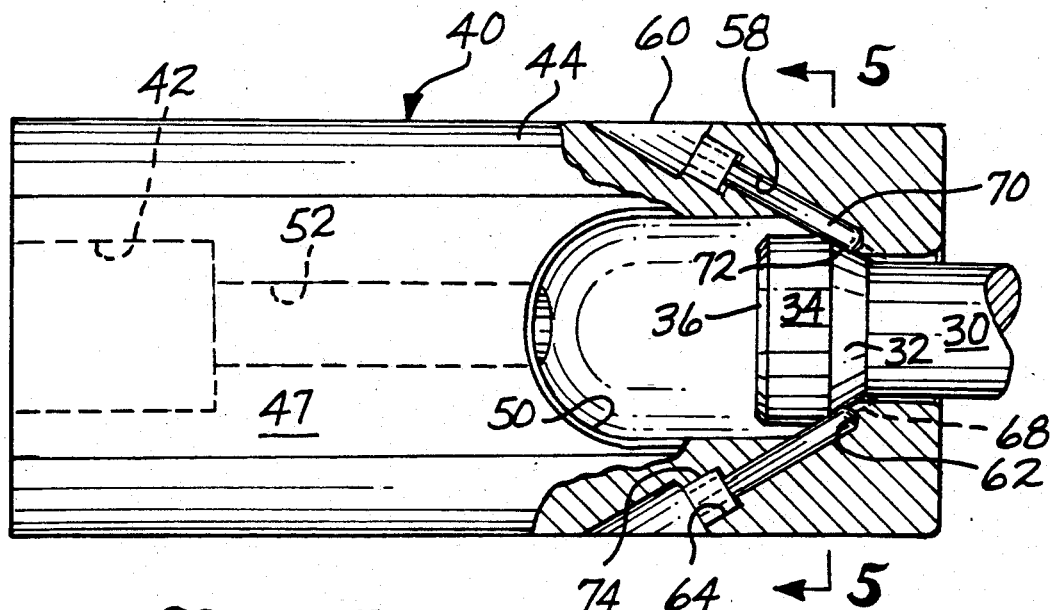

SYSTEM FOR COLD EXPANDING HOLES IN RAIL SECTIONS

TECHNICAL FIELD

This invention relates to cold expansion systems and, more particularly, to a method and apparatus for cold expanding holes in workpieces, such as rail sections, in which a mandrel is positioned in a hole and a chamfer on the projecting rear end portion of the mandrel is guided by guide surfaces into seating engagement with a tapered surface defining an upper portion of a U-shaped slot in a jaw of a pulling mechanism.

BACKGROUND INFORMATION

Railroad tracks include parallel steel rails, each of which is formed by a series of rail sections. FIG. 1 illustrates the adjacent portions of two such rail sections 2. Each section 2 comprises a lower flange 4 and an upper flange or railhead 6 connected by a vertical web 8. The two sections 2 are secured together by two connector plates 12 positioned on opposite sides of the web 8. Each plate 12 has a plurality of fastener holes 14 that are aligned with fastener holes 10 in the webs 8. The aligned holes 10, 14 receive removable fasteners 16 to secure the sections 2 together. The repair and maintenance of the rails often require on-site cold expansion of the fastener holes 10 in the rail section webs 8 to prevent the formation or growth of cracks in the webs 8. The on-site cold expansion can be difficult because of the generally dirty conditions and the greatly varied environment surrounding the rail sections, and the need to carry out the cold expansion quickly and efficiently to avoid interruption of traffic along the tracks. The present invention addresses the problems associated with on-site cold expansion of fastener holes in rail sections.

SUMMARY OF THE INVENTION

A subject of the invention is apparatus for cold expanding a hole in a workpiece. According to a basic aspect of the invention, the apparatus comprises a mandrel, a jaw, and guide surfaces carried by the jaw. The mandrel has a tang portion and a chamfered portion extending radially outwardly and rearwardly from the tang portion. The jaw is attachable to a pulling mechanism and has a front end portion with a downwardly opening substantially U-shaped slot formed therein. It also has a tapered surface that defines an upper portion of the slot and is configured to seat against the chamfered portion of the mandrel to cause rearward movement of the jaw to pull the mandrel rearwardly. There are a pair of laterally opposite guide surfaces. The guide surfaces are positioned downwardly of the upper portion of the slot and project into the slot, and are configured, to guide the chamfered portion of the mandrel into seating engagement with the tapered surface.

The guide surfaces may be formed in various ways. Preferably, they are formed by a pair of guide members received into openings in the jaw. The openings intersect laterally opposite portions of the U-shaped slot. Each guide member is received into its corresponding opening and projects into the slot to form the guide surface. In its preferred configuration, the opening has an outer end that opens onto an outer circumferential surface of the jaw, extends laterally inwardly and forwardly from the outer end to the slot, and has an inner end defined by an abutment formed by the jaw body.

The guide member is preferably a pin that has a substantially cylindrical surface that forms the guide surface.

The guide members are preferably replaceable. In the preferred embodiment, the opening has a threaded outer end portion that receives a set screw to position the guide pin in the opening. This arrangement permits the pin to be easily but very securely positioned in the opening. The combination of the abutment at the inner end and the set screw prevent the pin from dislodging from its proper position during use of the apparatus. The arrangement also permits the pin to be removed when necessary, such as when it needs to be replaced because of wear. In order to facilitate removal of the pin, the jaw preferably includes a tap hole extending from the slot to and through the abutment at the inner end of the pin opening. When the set screw has been removed, a tool may be inserted into the tap hole to move the pin in the opening toward the outer end.

The apparatus of the invention preferably includes a nosecap in addition to the mandrel and jaw. The nosecap has an axial opening that receives the jaw, and a forward end portion with a downwardly opening substantially U-shaped slot formed therein. The slot is configured to form a forward and downward extension of the slot in the jaw. The front surface of the nosecap is positioned to abut the workpiece. The guide surfaces on the jaw and the abutment of the nosecap on the workpiece cooperate to ensure that the mandrel is in proper alignment with the jaw and the pulling mechanism when the apparatus is in use.

Another feature that contributes to the maintenance of the proper alignment is an abutment surface on the jaw defining a portion of the U-shaped slot forward of the tapered surface. This abutment surface is configured to seat against the tang portion of the mandrel when the tapered surface is seated against the chamfered portion.

The maintenance of proper alignment provided by the features discussed above helps to prevent malfunctioning and damage to the apparatus during a cold expansion operation. It also allows the operation to be carried out more quickly and easily. The increased efficiency of the operation and the increased useful life of the apparatus both contribute to the cost effectiveness of the apparatus and the method of cold expanding using the apparatus.

Another subject of the invention is a method of cold expanding a hole in a workpiece. The method comprises providing a mandrel, a jaw, and a nosecap. The mandrel has, in series, a maximum diameter portion, a tapered portion, a tang portion, and a rear end portion including a chamfer extending radially outwardly and rearwardly from the tang portion. The jaw has a front end portion with a substantially U-shaped slot formed therein, and a tapered surface defining an inner portion of the slot. A pair of laterally opposite guide surfaces are carried by the jaw and project into the slot adjacent to the tapered surface. The nosecap has an axial opening, a front surface, and a substantially U-shaped slot extending through the front surface. In the practice of the method, the mandrel is inserted into the hole in the workpiece, and is moved in the hole until the tapered portion is firmly seated in the hole and the rear end portion projects rearwardly from the hole. The jaw is inserted into the axial opening in the nosecap, and the U-shaped slots are aligned. The jaw and the nosecap are moved downwardly over the projecting rear end portion of the mandrel. The guide surfaces guide the chamfer into seating engagement with the tapered surface.

The front surface of the nosecap is placed into abutment with the workpiece around the hole. With the tapered surface seated against the chamfer and the front surface of the nosecap abutting the workpiece, the jaw is pulled rearwardly in the nosecap axial opening to pull the maximum diameter portion of the mandrel through the hole to cold expand the hole.

A preferred feature of the method is striking a front portion of the mandrel with an elastic mallet to move the mandrel in the hole and securely seat the tapered portion. This procedure is easily accomplished. Its purpose is to ensure that the mandrel remains in proper alignment for the pulling step. This is achieved without damage to the mandrel.

In the practice of the method, the mandrel may be used alone or in combination with a disposable sleeve or a bushing that is permanently installed in the hole. In the preferred embodiment of the method, the mandrel is used in combination with a sleeve. The sleeve is positioned on the mandrel rearwardly of the maximum diameter portion and is seated in the hole. The step of pulling the jaw comprises pulling the maximum diameter portion of the mandrel through the sleeve seated in the hole. The sleeve preferably has a head portion larger in diameter than the hole. When the sleeve is seated in the hole, the head portion is brought into abutment against a front surface of the workpiece around the hole. The abutment of the head portion maintains the sleeve in its seated position during the pulling operation to provide the desired degree of cold expansion of the hole.

The method and apparatus of the invention may be used in various environments. However, they are especially well-suited to the cold expansion of fastener holes in rail sections during on-site maintenance and repair of railroad tracks. The method and apparatus are adapted to the flanged configuration of rail sections and are suitable for use in a wide variety of environmental conditions. The invention makes cold expansion of holes possible even under highly adverse environmental conditions without sacrificing accuracy and speed of operation. The structure of the jaw and nosecap of the invention allows sensitive moving parts of the pulling mechanism to be isolated from the grease and dirt usually present on rail sections. The U-shaped configuration of the slots in the jaw and nosecap allow easy cleaning of these components to remove grease and dirt pulled in by the mandrel. In addition, as noted above, the invention helps prevent misalignments to thereby prevent delays in the cold expansion process and damage to the apparatus and/or rail sections.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a fragmentary pictorial view of two adjacent rail sections, with foreground portions out away to illustrate the aligned hole configuration.

FIG. 2 is an exploded pictorial view of the preferred embodiment of the apparatus of the invention and fragmentary portions of a pulling mechanism.

FIG. 3 is a bottom plan view of the apparatus shown in FIG. 2 during the practice of the preferred embodiment of the method just prior to the pulling of the mandrel.

FIG. 4 is a sectional view taken along the line 4—4 in FIG. 3.

FIG. 5 is a cross-sectional view taken along the line 5—5 in FIG. 7.

FIG. 6 is a front end view of the nosecap and the jaw shown in FIGS. 2-4 assembled together.

FIG. 7 is a bottom plan view of the jaw shown in FIGS. 2-6 and a rear portion of the mandrel seated in the jaw, with foreground portions cut away to illustrate the positioning of the guide pins.

BEST MODE FOR CARRYING OUT THE INVENTION

The drawings show the best mode for carrying out the method and apparatus of the invention currently known to the applicant. In the drawings, the method and apparatus are shown being used to cold expand a fastener hole 10 in a track section 2. It is currently anticipated that the primary use for the method and apparatus of the invention will be for cold expanding such holes. However, it is intended to be understood that the invention may also be used to advantage for cold expanding both fastener holes and other holes in other types of workpieces.

The apparatus of the invention includes a mandrel, a jaw, and preferably a nosecap. The preferred embodiment of the mandrel 20 can best be seen in FIGS. 2-4. A bevel 22 is formed on the front end of the mandrel 20. Rearwardly of the bevel 22 is a maximum diameter portion 24 and then a tapered portion 26. The dimensions of these portions 24, 26 are chosen to provide a desired degree of cold expansion of a hole of a particular size. Rearwardly of the tapered portion 26 is a first chamfer 28 and then a tang portion 30. The tang portion 30 is preferably cylindrical but could also have a different configuration. For example, the tang portion could be a tapered continuation of the tapered portion 26. In such case, the chamfer 28 would be eliminated. A second chamfer 32 extends radially outwardly and rearwardly from the tang portion 30 and provides an engagement surface by which the jaw engages the mandrel 20. The rear end of the mandrel 20 rearward of the chamfer 32 includes a cylindrical portion 34 and terminates in a rear bevel 36.

The jaw element of the apparatus of the invention is attachable to a pulling mechanism. This mechanism may take various forms. A portion of one such mechanism is illustrated in FIGS. 2-4. The preferred embodiment of the jaw 40 shown in the drawings has a rear axially oriented threaded opening 42 for engaging the threaded end 112 of a piston 110. It is currently anticipated that in most railroad maintenance and repair operations, the piston 110 will be moved forwardly and rearwardly to move the jaw 40 by means of a portable hydraulic power system.

The main body of the jaw 40 is generally cylindrical and has cylindrical outer circumferential surface portions 44. The outer surface of the jaw body also includes an axially extending flat 46 on each side and a flat bottom surface 47. A barrel portion of a pulling mechanism, such as the barrel 102 shown in FIGS. 2-4, may have a corresponding inner flat surface 107 to prevent rotation of the jaw 40 relative to the barrel 102 and the nosecap when the apparatus is assembled as described below. The jaw 40 terminates at its front end in a flat front surface 48. A downwardly opening substantially U-shaped slot 50 is formed in the jaw body and extends through the front surface 48 and opens along the bottom surface 47. It should be noted that the jaw 40 and other elements of the apparatus are shown in FIG. 2 in an upside down orientation to facilitate illustration of the structure of the apparatus. A reduced diameter cylindrical passageway 52 extends through the jaw body and communicates the rear threaded opening 42 and the forward U-shaped slot 50. The passageway 52 reduces the weight of the jaw 40.

The forward end portion of the jaw 40 is designed to receive, correctly position, and firmly engage the rear end of the mandrel 20. An abutment surface 54 extends perpendicularly and rearwardly from the front surface 48 of the jaw 40 and defines a forward portion of the slot 50. The abutment surface 54 is configured to seat against the tang portion 30 of the mandrel 20 when the mandrel 20 is engaged by the jaw 40. Rearwardly of the abutment surface is a tapered surface 56 that defines an upper portion of the slot 50. The tapered surface 56 is configured to seat against the chamfered portion 32 of the mandrel 20. The engagement of the chamfered portion 32 by the tapered surface 56 causes rearward movement of the jaw 40 to pull the mandrel 20 rearwardly. The simultaneous engagement of the mandrel tang portion 30 by the abutment surface 54 helps to stabilize the engagement between the chamfer 32 and the tapered surface 56 and to maintain the mandrel 20 in alignment with the jaw 40 and the pulling mechanism. The dimensions of the slot 50 are chosen to be large enough so that the mandrel 20 will be received into the slot 50 even if small burrs form on the slot sidewall during use of the jaw 40, and to be small enough to avoid severe stresses on the jaw 40.

A major feature of the invention is the provision of a pair of laterally opposite guide surfaces carried by the jaw. When the jaw is in its use position illustrated in FIGS. 3 and 4, the guide surfaces are positioned downwardly of the upper portion of the slot 50 defined by the tapered surface 56. As shown in FIG. 5, the guide surfaces 72 project into the slot 50 and are configured to guide the chamfered portion 32 of the mandrel 20 into seating engagement with the tapered surface 56 on the jaw 40. Both the configuration of the guide surfaces and the manner in which the guide surfaces are formed may be varied. For example, the guide surfaces could be machined integral portions of the jaw body. However, the guide surfaces are preferably formed by a pair of guide members that are received into openings in the jaw 40 and project into the slot 50.

Referring to FIGS. 2-7, in the preferred embodiment of the invention, the guide surfaces are formed by the cylindrical circumferential surfaces 72 of two substantially cylindrical pins 70. The pins 70 are preferably made from very hard, wear resistant steel. A pair of openings 58 are formed in the jaw 40 to receive the pins 70. The openings 58 intersect laterally opposite portions of the U-shaped slot 50. The preferred configuration of the openings can best be seen in FIGS. 2 and 7. Each opening 58 has an outer end 60 that opens onto the outer circumferential surface 44 of the jaw body. The opening 58 extends laterally inwardly and forwardly from its outer end 60 to an inner end 62. The inner end is defined by an abutment 62 formed by the jaw body. The forward end of the pin 70 abuts the abutment 62 and has an edge portion that projects slightly into the slot 50. The pin's cylindrical surface 72 is positioned adjacent to and rearwardly of the jaw's tapered surface 56. The angling of the pin openings 58 angles the pins 70 to orient them so that the guide surfaces 72 are positioned to guide the chamfer 32 on the mandrel 20 into engagement with the tapered jaw surface 56. The curved guide surfaces prevent the apparent engagement of the mandrel 20 in the jaw 40 before it is fully moved into the U-shaped slot 50. This in turn prevents the inadvertent carrying out of the pulling stage of the cold expansion process with the mandrel 20 not in full engagement with the jaw 40.

Each pin 70 is preferably removably but securely positioned in its opening 58. The preferred manner of positioning the pin 70 can best be seen in FIGS. 2 and 7. The opening 58 has a threaded outer end portion 64 just inward of the enlarged outer end 60 on the outer circumferential surface 44 of the jaw 40. A set screw 74 is threaded into this opening portion 64 and abuts the outer end of the pin 70. A flat rearward extension 66 of the abutment surface 54 is formed on the jaw 40 on each side of the U-shaped slot 50 downwardly of the tapered surface 56. The extension 66 increases the support for the pin 70 and provides the inner abutment 62 for the forward end of the pin 70. The extension 66 also facilitates the forming of a tap hole 68. The tap hole 68 extends through the jaw body from the portion of the slot 50 defined by the flat extension 66 to and through the abutment 62. The tap hole 68 provides a convenient means for dislodging the pin 70 from the opening 58 to enable repair or replacement of the pin 70. To accomplish this, the set screw 74 is removed, and a tool is inserted in the tap hole 68 to push the pin 70 outwardly in the opening 58 toward the outer end 60.

As noted above, the apparatus of the invention preferably includes a nosecap in addition to the mandrel and the jaw. The preferred embodiment of the nosecap 78 is shown in FIGS. 2-4 and 6. The nosecap 78 has an axial opening 80 extending therethrough. The cylindrical rear portion of the axial opening 80 is provided with internal threads 82 for engaging the threaded forward projection 104 of the barrel 102 of the pulling mechanism. The engagement of the nosecap 78 by the barrel 102 is secured by a lock ring 108. The barrel 102 has an axial opening 106 to enable the piston to extend therethrough and into the axial opening 80 in the nosecap 78 to engage the jaw 40. The nosecap 178 has a downwardly opening U-shaped slot 84 that extends through the front surface 88 of the nosecap 78 to correspond to the U-shaped slot 50 in the jaw 40. The slot 84 in the nosecap 78 forms the forward portion of the axial opening 80 and intersects the rear cylindrical portion.

The front surface 88 of the nosecap 78 is best seen in FIG. 6. The configuration of the surface 88 is chosen to provide a relatively large abutment surface between the nosecap 78 and the workpiece around the hole being expanded to maintain proper alignment of the elements of the apparatus and the workpiece during the cold expansion procedure. The top portion of the front end of the nosecap 78 has beveled surfaces 86, 87, and the bottom portion has rearwardly extending surfaces 90 and sloping surfaces 92, to enable the front end of the nosecap 78 to fit between the flanges 4, 6 of a rail section 2 and the front surface 88 to securely abut the rail section web 8, as illustrated in FIG. 4.

The method of the invention is preferably carried out using the preferred embodiments of the mandrel 20, jaw 40, and nosecap 78 shown in the drawings. Before it is engaged by the jaw 40, the mandrel 20 is inserted into the hole 10 to be cold expanded. As shown in the drawings, the hole is a fastener hole 10 in a rail section 2. The mandrel 20 is preferably inserted into the hole by inserting the rear end portion of the mandrel 20 into the forward side of the hole 10. This insertion procedure permits the use of a relatively thin-walled sleeve and a mandrel with a maximum diameter portion larger than the unexpanded hole. A smaller mandrel maximum diameter would require a sleeve with a thicker sidewall to obtain the desired degree of expansion. The procedure also enables the orientation of the sleeve flange shown in FIGS. 3 and 4 and described below. The mandrel 20 is inserted and moved rearwardly in the hole 10 until the tapered portion 26 is firmly seated in the hole 10 and the rear end portion is projecting rearwardly from the hole 10. The firm seating of the tapered portion 26 can be assured by striking a front portion of the mandrel 20 with an elastic mallet, such as a rubber or urethane mallet.

The jaw 40 is inserted into the axial opening 80 in the nosecap 78, and the U-shaped slots 50, 84 in these two members are aligned. The slot 84 in the nosecap 78 forms a forward and downward extension of the slot 50 in the jaw 40. The jaw 40 is threadedly connected to the puller piston 110, and the nosecap 78 is threadedly connected to the puller barrel 102. The steps of this assembly procedure may be carried out in various orders subject to the physical limitations imposed by the structures of the elements.

After the jaw 40 has been positioned in the axial opening 80 in the nosecap 78, and preferably after the puller mechanism has been attached to the jaw 40 and nosecap 78 and relative rotation of the jaw 40 has been restrained by the puller barrel 102, the jaw 40 and nosecap 78 are moved downwardly over the rear end portion of the mandrel 20 projecting from the hole 10. As the jaw 40 and nosecap 78 are moved downwardly, the rear portion of the mandrel tang 30 and the mandrel chamfer 32 move into the U-shaped slot 50, 84. The guide surfaces 72 guide the chamfer 32 into seating engagement with the jaw's tapered surface 56. This generally occurs during the step of moving the jaw 40 and nosecap 78 down over the mandrel 20. However, if for some reason the mandrel 20 is positioned too far back in the U-shaped slots 50, 84, the entire chamfer 32 may be rearward of the tapered surface 56 and the guide surfaces 72. In such a case, initial rearward movement of the jaw 40 at the commencement of the subsequent pulling procedure will bring the guide surfaces 72 and the tapered surface 56 to the same axial position as the rear end portion of the mandrel 32, 34 to ensure that the chamfer 32 is properly seated against the tapered surface 56.

As the jaw 40 and nosecap 78 are moved downwardly, the front surface 88 of the nosecap 78 is brought into abutment with the rear surface of the rail section web 8 around the hole 10. With the front surface 88 in abutment with the web 8 and the jaw tapered surface 56 seated against the mandrel chamfer 32, the pulling mechanism is operated to pull the jaw 40 rearwardly in the axial openings 80, 106 in the nosecap 78 and the barrel 102. The rearward movement of the jaw 40 pulls the maximum diameter portion 24 of the mandrel 20 through the hole 10 to cold expand the hole 10. FIGS. 3, 4, and 7 illustrate the positions of the components of the apparatus and the workpiece at the commencement of the pulling step.

The method is preferably carried out using a disposable sleeve, such as the sleeve 96 shown in FIGS. 2-4, to reduce wear on the mandrel 20. The sleeve 96 is of a known type and has a cylindrical body with a flared head portion 100. As shown, the flange forming the head 100 is angled at 45° to the cylindrical body. Other angular orientations would also be suitable, including a 90° orientation. The angle should be sufficient to ensure that the sleeve 96 is not inadvertently pulled through the hole 10 by the mandrel 20 during the pulling operation. The sleeve 96 has a split 98 extending axially along its length.

In use, the sleeve 96 is positioned on the tapered portion 26 of the mandrel 20 rearwardly of the maximum diameter portion 24 and is seated in the hole 10. The seating of the sleeve 96 in the hole 10 should be accomplished with the split 98 oriented pointing away from the adjacent rail end to minimize any possible effect of the split 98 on the rail 2. The sleeve 96 may be first positioned on the mandrel 20 and then the mandrel 20 and the sleeve 96 together inserted into the hole 10. Alternatively, the sleeve 96 may be inserted into the hole 10 before the mandrel 20 is inserted. In either case, the step of pulling the jaw 40 to cold expand the hole 10 includes pulling the maximum diameter mandrel portion 24 through the sleeve 96 while the sleeve 96 is seated in the hole 10, as shown in FIGS. 3 and 4. As the jaw 40 is pulled, the abutment of the angled flange 100 on the sleeve 96 against the front surface of the rail section web 8 around the hole 10 prevents the sleeve 96 from unintentionally being pulled out of the hole 10. When the mandrel 20 has been pulled all the way through the hole 10 and sleeve 96, the mandrel 20 is free to drop out of the jaw 40 and nosecap 78 upon return of the piston 110. The mandrel 20 may then be cleaned and inserted into another hole to be cold expanded. The sleeve 96 is removed from the expanded hole and discarded. The hole 10 may then be finished, if necessary, before a fastener is inserted therethrough.

As used herein, the terms "downwardly", "upper", and the like are used in reference to the use orientation shown in FIGS. 3 and 4.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. Apparatus for cold expanding a hole in a workpiece, comprising:
   a mandrel having a tang portion and a chamfered portion extending radially outwardly and rearwardly from said tang portion; and
   a jaw attachable to a pulling mechanism and having a front end portion with a downwardly opening substantially U-shaped slot formed therein; said jaw having a tapered surface that defines an upper portion of said slot and is configured to seat against said chamfered portion of said mandrel to cause rearward movement of said jaw to pull said mandrel rearwardly; and
   a pair of laterally opposite guide surfaces carried by said jaw; said guide surfaces being positioned downwardly of said upper portion and projecting into said slot, and being configured, to guide said chamfered portion of said mandrel into seating engagement with said tapered surface.

2. The apparatus of claim 1, in which said jaw has a pair of openings formed therein and intersecting laterally opposite portions of said U-shaped slot; and Which comprises a pair of guide members received into said openings and projecting into said slot to form said guide surfaces.

3. The apparatus of claim 2, in which each said opening has an outer end that opens onto an outer circumferential surface of said jaw.

4. The apparatus of claim 3, in which each said opening has an inner end opposite said outer end, and said jaw forms an abutment that defines said inner end.

5. The apparatus of claim 2, in which each said opening extends laterally inwardly and forwardly to said slot, and each said guide member comprises a pin having a substantially cylindrical surface that forms said guide surface.

6. The apparatus of claim 5, in which each said opening has an outer end that opens onto an outer circumferential surface of said jaw.

7. The apparatus of claim 6, in which each said opening has an inner end opposite said outer end, and said jaw forms an abutment that defines said inner end.

8. The apparatus of claim 6, in which each said opening has a threaded outer end portion; and which comprises a set screw threadedly received into said threaded portion to position said pin in said opening.

9. The apparatus of claim 8, in which each said opening has an inner end opposite said outer end, and said jaw forms a pin abutment that defines said inner end.

10. The apparatus of claim 9, in which said jaw includes a tap hole extending from said slot to and through said abutment for receiving a tool to move said pin in said opening toward said outer end.

11. The apparatus of claim 6, in which each said opening has an inner end opposite said outer end, said jaw forms a pin abutment that defines said inner end, and said jaw includes a tap hole extending from said slot to and through said abutment for receiving a tool to move said pin in said opening toward said outer end.

12. The apparatus of claim 1, further comprising a nosecap having an axial opening dimensioned to receive said jaw, a forward end portion with a downwardly opening substantially U-shaped slot formed therein configured to form a forward and downward extension of said slot in said jaw, and a front surface positioned to abut the workpiece.

13. The apparatus of claim 1, in which said jaw has an abutment surface defining a portion of said slot forward of said tapered surface and configured to seat against said tang portion when said tapered surface is seated against said chamfered portion.

14. A method of cold expanding a hole in a workpiece, comprising:
providing a mandrel having, in series, a maximum diameter portion, a tapered portion, a tang portion, and a rear end portion including a chamfer extending radially outwardly and rearwardly from said tang portion;
providing a jaw having a front end portion with a substantially U-shaped slot formed therein, and a tapered surface defining an inner portion of said slot; and a pair of laterally opposite guide surfaces carried by said jaw and projecting into said slot adjacent to said tapered surface;
providing a nosecap having an axial opening, a front surface, and a substantially U-shaped slot extending through said front surface;
inserting said mandrel into the hole, and moving said mandrel in the hole until said tapered portion is firmly seated in the hole and said rear end portion is projecting rearwardly from the hole;
inserting said jaw into said axial opening in said nosecap, and aligning said slots;
moving said jaw and said nosecap downwardly over said projecting rear end portion, and allowing said guide surfaces to guide said chamfer into seating engagement with said tapered surface;
placing said front surface of said nosecap into abutment with the workpiece around the hole; and
with said tapered surface seated against said chamfer and said front surface abutting the workpiece, pulling said jaw rearwardly in said axial opening to pull said maximum diameter portion of said mandrel through the hole to cold expand the hole.

15. The method of claim 14, in which each said guide surface is formed by a cylindrical surface of a pin received in a laterally inwardly and forwardly extending opening in said jaw.

16. The method of claim 14, in which the step of moving said mandrel in the hole comprises striking a front portion of the mandrel with an elastic mallet.

17. The method of claim 14, which comprises positioning a sleeve on said mandrel rearwardly of said maximum diameter portion, and seating said sleeve in the hole; and in which the step of pulling said jaw comprises pulling said maximum diameter portion through said sleeve seated in the hole.

18. The method of claim 17, in which said sleeve has a head portion larger in diameter than the hole, and the step of seating said sleeve in the hole comprises abutting said head portion against a front surface of the workpiece around the hole.

* * * * *